(12) United States Patent
Shinmen et al.

(10) Patent No.: US 9,356,319 B2
(45) Date of Patent: May 31, 2016

(54) METHOD FOR PRODUCING LITHIUM TETRAFLUOROBORATE SOLUTION

(75) Inventors: Masutaka Shinmen, Sanyoonoda (JP); Shoichi Tsujioka, Iruma-gun (JP); Tetsu Taroura, Iruma-gun (JP); Keiji Sato, Ube (JP); Takayoshi Morinaka, Ube (JP)

(73) Assignee: Central Glass Company, Limited, Ube-shi (JP)

( * ) Notice: Subject to any disclaimer, the term of this patent is extended or adjusted under 35 U.S.C. 154(b) by 140 days.

(21) Appl. No.: 14/112,367

(22) PCT Filed: Jul. 31, 2012

(86) PCT No.: PCT/JP2012/069403
§ 371 (c)(1),
(2), (4) Date: Oct. 17, 2013

(87) PCT Pub. No.: WO2013/018784
PCT Pub. Date: Feb. 7, 2013

(65) Prior Publication Data
US 2014/0162144 A1   Jun. 12, 2014

(30) Foreign Application Priority Data

Aug. 3, 2011   (JP) .................................. 2011-170432

(51) Int. Cl.
| | |
|---|---|
| *H01M 10/0568* | (2010.01) |
| *H01M 10/0569* | (2010.01) |
| *H01M 10/052* | (2010.01) |
| *C01B 35/06* | (2006.01) |

(52) U.S. Cl.
CPC ......... *H01M 10/0568* (2013.01); *C01B 35/066* (2013.01); *H01M 10/052* (2013.01); *H01M 10/0569* (2013.01); *H01M 2300/0028* (2013.01); *Y02E 60/122* (2013.01); *Y02P 70/54* (2015.11)

(58) Field of Classification Search
CPC .................................................. H01M 10/052
See application file for complete search history.

(56) References Cited

U.S. PATENT DOCUMENTS

| 3,655,332 A | 4/1972 | Smith, Jr. | |
| 2003/0190530 A1 * | 10/2003 | Yang et al. | 429/326 |
| 2008/0206636 A1 * | 8/2008 | Sanada et al. | 429/185 |
| 2010/0323240 A1 * | 12/2010 | Tsujioka et al. | 429/199 |
| 2011/0214895 A1 * | 9/2011 | Ihara et al. | 173/217 |
| 2012/0082608 A1 * | 4/2012 | Waki et al. | 423/276 |
| 2013/0143112 A1 | 6/2013 | Oe et al. | |

FOREIGN PATENT DOCUMENTS

| CA | 2 766 014 A1 | 12/2010 |
| JP | 56-145113 A | 11/1981 |
| JP | 9-139232 A | 5/1997 |
| JP | 11-154519 A | 6/1999 |
| JP | 11-157830 A | 6/1999 |
| JP | 2000-260469 A | 9/2000 |
| JP | 2001-118578 A | 4/2001 |
| JP | 2001-247307 A | 9/2001 |
| JP | 3375049 B2 | 11/2002 |
| JP | 3369937 B2 | 1/2003 |
| WO | WO 2010/146710 A1 * | 12/2010 |
| WO | WO 2012/023534 A1 | 2/2012 |

OTHER PUBLICATIONS

Corresponding International Search Report with English Translation dated Oct. 9, 2012 (five (5) pages).
Japanese-language Written Opinion dated Oct. 9, 2012 (PCT/ISA/237) (three (3) pages).
Extended European Search Report dated Mar. 31, 2015 (seven (7) pages).
Korean Office Action dated Feb. 27, 2015 (Five (5) pages).
Xu, "Nonaqueous Liquid Electrolytes for Lithium-Based Rechargeable Batteries", Chem. Rev. 2004, 104, Electrochemistry Branch, Sensor and Electron Devices Directorate, U.S. Army Research Laboratory, Adelphi, Maryland , pp. 4303-4417, (One Hundred and Fifteen (115) pages).

* cited by examiner

*Primary Examiner* — Edu E Enin-Okut
*Assistant Examiner* — Brian Ohara
(74) *Attorney, Agent, or Firm* — Crowell & Moring LLP

(57) ABSTRACT

Disclosed is a production method of a lithium tetrafluoroborate solution for use as a lithium battery electrolytic solution, including: a reaction step of forming lithium tetrafluoroborate by reaction of lithium fluoride and boron trifluoride in a chain carbonate ester solvent and thereby obtaining a reaction solution of the lithium tetrafluoroborate dissolved in the chain carbonate ester solvent; a water removal step of adding a water removing agent to the reaction solution; an acidic impurity removal step of removing an acidic impurity component from the reaction solution by concentrating the reaction solution after the water removal step; and a dilution step of diluting the concentrated solution after the acidic impurity removal step. It is possible by this method to obtain the lithium tetrafluoroborate solution whose acidic impurity content and water content are reduced to be 50 mass ppm or lower and 15 mass ppm or lower, respectively.

8 Claims, No Drawings

METHOD FOR PRODUCING LITHIUM TETRAFLUOROBORATE SOLUTION

TECHNICAL FIELD

The present invention relates to a method for producing a solution of lithium tetrafluoroborate that is useful as an electrolyte for lithium batteries.

BACKGROUND ART

There are known two types of methods for synthesis of lithium tetrafluoroborate ($LiBF_4$), one type of which is known is called "wet method" and the other type of which is called "ether method". In the wet method, lithium tetrafluoroborate is synthesized as a hydrate salt ($LiBF_4 \cdot H_2O$) by reaction of fluoroboric acid with lithium carbonate. Although the hydrate salt needs to be dehydrated by heating at about 200° C., the lithium tetrafluoroborate gets decomposed ($LiBF_4 \rightarrow LiF + BF_3$) during the heating and becomes low in purity. Further, some water remains in the lithium tetrafluoroborate. The lithium tetrafluoroborate obtained by the wet method cannot thus be used for lithium batteries. In the ether method, lithium tetrafluoroborate is synthesized as an anhydrous salt by reaction of a complex compound of boron trifluoride and methyl ether or ethyl ether with lithium fluoride. The ether method however has some drawbacks that: the lithium tetrafluoroborate is difficult to dissolve in ether and thereby difficult to secure a satisfactory level of quality for use in lithium batteries: the use of dangerous ether is essential etc.

On the other hand, Patent Document 1 discloses a method for producing lithium tetrafluoroborate, by reacting lithium fluoride with boron trifluoride in a solvent of chain carbonate ester and dissolving the resulting lithium tetrafluoroborate in the solvent.

Patent Document 2 discloses a method for purifying a lithium battery electrolytic solution containing lithium tetrafluoroborate, by converting various acidic impurities to hydrogen halide with the addition of a halide to the electrolytic solution, removing the hydrogen halide from the electrolytic solution and thereby providing the electrolytic solution with less impurities.

PRIOR ART DOCUMENTS

Patent Documents

Patent Document 1: Japanese Patent No. 3375049
Patent Document 2: Japanese Patent No. 3369937

SUMMARY OF THE INVENTION

Problems to be Solved by the Invention

In the case of using lithium tetrafluoroborate etc. as an electrolyte in a lithium battery electrolytic solution, the electrolyte is readily subjected to hydrolysis due to the presence of water in the electrolytic solution so that there is generated an acidic impurity component such as hydrogen fluoride as a product of the hydrolysis. The electrolytic solution containing such an acidic impurity component, when used in the lithium battery, reacts with a positive electrode, a negative electrode or a solvent and becomes a cause of various problems e.g. deterioration in battery discharge capacity, increase in internal resistance, deterioration in cycle life etc. For this reason, it is desired to reduce the water content and acidic impurity content of the lithium battery electrolytic solution.

As each of the wet method and the ether method is to obtain lithium tetrafluoroborate in solid form, the lithium battery electrolyte solution is prepared by dissolving the obtained solid lithium tetrafluoroborate in a solvent. In this case, it suffices that the water content of the solid lithium tetrafluoroborate is of the order of 30 to 50 mass ppm in view of the fact that the lithium tetrafluoroborate is diluted with the solvent. In view of the fact that the lithium tetrafluoroborate is in the form of a crystalline solid, however, it is difficult to remove the acidic impurity component caught in the crystalline structure of the lithium tetrafluoroborate. Further, the lithium battery electrolytic solution is prepared at a predetermined composition ratio. It is thus impractical to dissolve the solid lithium tetrafluoroborate in the solvent and remove the acidic impurity component by degassing from the electrolytic solution in view of the possibility that the prepared lithium battery electrolytic solution may be changed from its original composition ratio by such acidic impurity removal operation.

Patent Documents 1 and 2 disclose the production of the lithium battery electrolytic solution containing lithium tetrafluoroborate and the removal of various acidic impurities from the electrolytic solution, but provide no mentions about the removal of water from the electrolytic solution. In the case where the dehydration of the lithium fluoride used as the raw material or of the solvent is not sufficient, the lithium tetrafluoroborate salt is subjected to hydrolysis due to the presence of water in the lithium battery electrolytic solution so that the acidic impurity component is generated as a product of the hydrolysis so as to cause an adverse effect on lithium battery performance. The methods of these patent documents are thus in need of improvements in terms of water content reduction.

It is accordingly an object of the present invention to provide a method for producing a lithium tetrafluoroborate solution reduced in acidic impurity content and water content for use as a lithium battery electrolytic solution.

Means for Solving the Problems

The present inventors have found, as a result of extensive researches made to solve the above problems, a method for producing a lithium tetrafluoroborate solution with less acidic impurity content and less water content for use as a lithium battery electrolytic solution. The present invention is based on this finding.

According to a first embodiment of the present invention, there is provided a production method of a lithium tetrafluoroborate solution for use as a lithium battery electrolytic solution, comprising: a reaction step of forming lithium tetrafluoroborate by reaction of lithium fluoride and boron trifluoride in a chain carbonate ester solvent and thereby obtaining a reaction solution of the lithium tetrafluoroborate dissolved in the chain carbonate ester solvent; a water removal step of adding a water removing agent to the reaction solution; an acidic impurity removal step of removing an acidic impurity component from the reaction solution by concentrating the reaction solution after the water removal step; and a dilution step of diluting the concentrated solution after the acidic impurity removal step, wherein the lithium tetrafluoroborate solution has an acidic impurity content of 50 mass ppm or lower and a water content of 15 mass ppm or lower.

According to a second embodiment of the present invention, there is provided a production method of a lithium tetrafluoroborate solution for use as a lithium battery electrolytic solution, comprising: a reaction/water removal step of forming lithium tetrafluoroborate by reaction of lithium fluoride and boron trifluoride in the presence of a water removing agent in a chain carbonate ester solvent and thereby obtaining a reaction solution of the lithium tetrafluoroborate dissolved in the chain carbonate ester solvent; an acidic impurity removal step of removing an acidic impurity component from the reaction solution by concentrating the reaction solution after the reaction/water removal step; and a dilution step of diluting the concentrated solution after the acidic impurity removal step, wherein the lithium tetrafluoroborate solution has an acidic impurity content of 50 mass ppm or lower and a water content of 15 mass ppm or lower.

In the case where the water removing agent is added to the solution of the reaction of the lithium fluoride and boron trifluoride, there occurs no side reaction between the resulting lithium tetrafluoroborate and the water removing agent. There also occurs no side reaction between the lithium fluoride or boron trifluoride and the water removing agent in the case where the lithium fluoride and boron trifluoride is reacted in the presence of the water removing agent in the solvent. The production methods according to the present invention are therefore advantageous in terms of high reaction yield and ease of reaction control. Further, it is possible to reduce the acid impurity content and water content of the obtained solution to 50 mass ppm or lower and 15 mass ppm or lower, respectively, by the addition of the water removing agent. The obtained solution can be used directly as it is as an electrolytic solution because of the use of the water removing agent that itself can serve as an electrolyte for a lithium battery electrolytic solution and the use of a lithium battery solvent as the reaction solvent.

DETAILED DESCRIPTION OF EMBODIMENTS

Hereinafter, the present invention will be described in detail below.

The production method according to the first embodiment of the present invention is characterized in that the production method goes through a reaction step of performing the formation reaction of lithium tetrafluoroborate, and then, a water removal step of removing water from the resulting reaction solution with the addition of a water removing agent. By contrast, the production method according to the second embodiment of the present invention is characterized in that the production method goes through a reaction/water removal step of, in the presence of a water removing agent, performing the formation reaction of lithium tetrafluoroborate simultaneously with the removal of water from the reaction solution.

In the reaction step of the first embodiment and in the reaction/water removal step of the second embodiment, the formation reaction of the lithium tetrafluoroborate is preformed in a chain carbonate ester. As lithium fluoride used as a raw material has very low solubility in this solvent, it is feasible to perform the formation reaction by blowing boron trifluoride gas into the solvent while dispersing the lithium fluoride in the solvent. The thus-formed lithium tetrafluoroborate is very high in solubility and dissolved in the solvent, without remaining as a coating on a surface of the lithium fluoride, so that the formation reaction proceeds completely.

The chain carbonate ester used in the formation reaction of the lithium tetrafluoroborate is preferably dimethyl carbonate, diethyl carbonate or ethyl methyl carbonate in view of high chemical stability and high solubility of lithium tetrafluoroborate.

The water removing agent used in the water removal step of the first embodiment and in the reaction/water removal step of the second embodiment is preferably at least one kind selected from the group consisting of lithium hexafluorophosphate, lithium hexafluoroarsenate and lithium hexafluoroantimonate. Each of these water removing agents itself can serve as an electrolyte for a lithium battery electrolytic solution and thus can be used in an excessive amount relative to the water to be removed. Although there is generated an acidic impurity component by reaction of water with the water removing agent, the thus-generated acidic impurity component can be removed in the acidic impurity removal step.

In each of the water removal step of the first embodiment and the reaction/water removal step of the second embodiment, the amount of the water removing agent used is preferably in the range of 0.01 to 20 mass %, more preferably 0.1 to 2 mass %, relative to the solvent. If the amount of the water removing agent is less than 0.01 mass % relative to the solvent, it may be difficult to remove the water. If the amount of the water removing agent exceeds 20 mass % relative to the solvent, it may be difficult to conduct separation operation such as filtration due to the deposition of the lithium tetrafluoroborate caused by increase in lithium salt concentration.

In the water removal step of the first embodiment, the amount of the water removing agent used is preferably 2.5 to 500 times the amount of water contained in the reaction solution in terms of mol ratio. If the amount of the water removing agent is less than 2.5 times the water amount in terms of mol ratio, it may unfavorably become difficult to remove the water. If the amount of the water removing agent exceeds 500 times the water amount in terms of mol ratio, there may unfavorably occur deposition of the lithium tetrafluoroborate. The amount of the water removing agent is more preferably 5 to 35 times, still more preferably, 12.5 to 17.5 times, the water amount in terms of mol ratio.

In the reaction/water removal step of the second embodiment, the amount of the water removing agent used is preferably 2.5 to 500 times the total amount of water contained in the raw materials (chain carbonate ester, lithium fluoride and boron trifluoride) of the reaction solution in terms of mol ratio. If the amount of the water removing agent is less than 2.5 times the total water amount in terms of mol ratio, it may unfavorably become difficult to remove the water. If the amount of the water removing agent exceeds 500 times the total water amount in terms of mol ratio, there may unfavorably occur deposition of the lithium tetrafluoroborate during the introduction of the boron trifluoride. The amount of the water removing agent is more preferably 5 to 35 times, still more preferably, 12.5 to 17.5 times, the total water amount in terms of mol ratio.

Further, the amount of the lithium fluoride used is preferably 200 g or less, more preferably 100 g or less, per 1 L of the solvent in each of the reaction step of the first embodiment and the reaction/water removal step of the second embodiment. If the amount of the lithium fluoride is more than 200 g relative to 1 L of the solvent, it may become difficult to conduct separation operation such as filtration due to the reasons that, as the reaction product becomes saturated, there occurs a coating on the surface of the lithium fluoride or remains unreacted lithium fluoride in the reaction system; and the solvent increases in viscosity etc.

It is preferable to introduce the boron trifluoride while diluting the boron trifluoride with an inert gas such as nitrogen. If the boron trifluoride is not diluted with the inert gas, there may unfavorably occur backflow of the solvent in the introduction tube during bubbling of the boron trifluoride. The amount of the boron trifluoride used is less than an equivalent amount relative to the lithium fluoride. If the amount of the boron trifluoride exceeds the equivalent amount, there arises an unfavorable tendency to cause increase in acidic impurity content by absorption of excessive boron trifluoride in the solvent. The acidic impurity content can be limited to a low level when the total amount of the lithium fluoride used is controlled to within the range of 1 to 1.1 mol times the total amount of the boron trifluoride used.

In the reaction step of the first embodiment, it is preferable to control the temperature of the reaction solution to within the range of −40 to 100° C., more preferably 0 to 60° C. If the reaction temperature is lower than −40° C., the reaction may not proceed due to the solidification of the solvent. If the reaction temperature is higher than 100° C., the solvent may be reacted with the boron trifluoride to cause discoloration or viscosity increase.

It is preferable to maintain the temperature of the reaction solution at 15 to 50° C. in the water removal step of the first embodiment. If the temperature of the reaction solution is lower than 15° C., it may unfavorably become difficult to remove the water. If the temperature of the reaction solution is higher than 50° C., the water removing agent may be decomposed to cause discoloration or make it difficult to remove the acidic impurity component. The temperature of the reaction solution is more preferably 30 to 45° C., still more preferably 40 to 45° C.

In the reaction/water removal step of the second embodiment, it is preferable to maintain the temperature of the reaction solution at −40 to 50° C. If the temperature of the reaction solution is lower than −40° C., the reaction may not proceed due to the solidification of the solvent. If the temperature of the reaction solution is higher than 50° C., the water removing agent may be decomposed to cause discoloration or make it difficult to remove the acidic impurity component. The temperature of the reaction solution is more preferably 0 to 20° C.

In the case where any insoluble matter is present in the reaction solution obtained by the reaction step of the first embodiment or the reaction/water removal step of the second embodiment, the insoluble matter can be removed by filtration from the reaction solution. For example, excessive lithium fluoride can be filtrated out of the reaction solution in the case where the total amount (mol amount) of the lithium fluoride used is more than the total amount (mol amount) of the boron trifluoride used. In the first embodiment, it is feasible to conduct the filtration e.g. after the reaction step, after the water removal step, after the acidic impurity removal step or the dilution step. In the second embodiment, it is feasible to conduct the filtration e.g. after the reaction/water removal step, after the acidic impurity removal step or the dilution step. The filtration can be conducted by a pressure filtration device, a vacuum filtration device or a filter press machine using a filter cloth, a cartridge filter or the like, a centrifugal sedimentation machine, a cross-flow filtration device using an ultrafiltration membrane etc.

In the reaction step of the first embodiment and in the reaction/water removal step of the second embodiment, the boron trifluoride used as the raw material and the lithium tetrafluoroborate obtained as the reaction product are readily subjected to hydrolysis due to the presence of water. It is thus preferable to perform each of the reaction step of the first embodiment and the reaction/water removal step of the second embodiment under the atmosphere of no water content, that is, under the near vacuum or the atmosphere of inert gas such as nitrogen.

It is preferable to perform the acidic impurity removal step of the first or second embodiment by maintaining the reaction solution in a sealed reaction vessel under reduced pressure conditions lower than 100 kPa in terms of absolute pressure. If the pressure is higher than or equal to 100 kPa, it may become unfavorably difficult to remove the acidic impurity component. The acidic impurity removal step is more preferably preformed by concentration under reduced pressure conditions of 10 kPa or lower, still more preferably 1 kPa or lower. It is feasible to perform the acidic impurity removal step under reduced pressure conditions of 100 Pa or higher as long as the pressure is in the above range.

It is also preferable to perform the acidic impurity removal step of the first or second embodiment by maintaining the temperature of the reaction solution at 25 to 50° C. If the temperature of the reaction solution is lower than 25° C. under reduced pressure conditions, it may become unfavorably difficult to remove the acidic impurity component. If the temperature of the reaction solution is higher than 50° C. under reduced pressure conditions, there may unfavorably occur decomposition of the water removing agent in the reaction solution. The temperature of the reaction solution is more preferably 30 to 45° C., still more preferably 40 to 45° C.

The water may further be removed by concentration operation in the acidic impurity removal step.

In each of the first and second embodiments, the total concentration of the lithium tetrafluoroborate and the water removing agent present in the concentrated solution after the condensation operation is preferably 18 to 25 mass %. If the total concentration is less than 18 mass %, it may unfavorably become difficult to remove the acidic impurity component. If the total concentration exceeds 25 mass %, there may unfavorably occur crystalline deposition of the lithium tetrafluoroborate. The total concentration of the lithium tetrafluoroborate and the water removing agent in the concentrated solution after the condensation operation is more preferably 20 to 23 mass %, still more preferably 21 to 22 mass %.

In the dilution step of the first or second embodiment, the concentration of the lithium tetrafluoroborate solution is adjusted as appropriate by diluting the concentrated solution after the acidic impurity removal step. The total concentration of the lithium tetrafluoroborate and the water removing agent present in the diluted solution is preferably less than 21 mass %. If the total concentration exceeds 21 mass %, there may unfavorably occur crystalline deposition of the lithium tetrafluoroborate under low-temperature conditions. The total concentration of the lithium tetrafluoroborate and the water removing agent in the diluted solution is more preferably less than 20 mass %, still more preferably less than 19 mass %.

It is possible by the above methods to obtain the lithium tetrafluoroborate solution whose acidic impurity content and water content are reduced to be 50 mass ppm or lower and 15 mass ppm or lower, respectively, as compared to conventional methods.

It is unfavorable that, for use as the lithium battery electrolytic solution, the lithium tetrafluoroborate solution has an acidic impurity content exceeding 50 mass ppm. It is because such a high acidic impurity content causes an adverse effect on battery performance. The acidic impurity content of the lithium tetrafluoroborate solution is preferably 40 mass ppm or lower, more preferably 30 mass ppm or lower. The lithium tetrafluoroborate solution may have an acidic impurity content of 20 ppm or higher as long as the acidic impurity content of the lithium tetrafluoroborate solution is within the above range.

It is also unfavorable that, for use as the lithium battery electrolytic solution, the lithium tetrafluoroborate solution has a water content exceeding 15 mass ppm. It is because such a high water content causes increase in acidic impurity content during the production of various electrolytic solutions. The water content of the lithium tetrafluoroborate solution is preferably 10 mass ppm or lower, more preferably 5 mass ppm or lower. The lithium tetrafluoroborate solution may have a water content of 1 mass ppm or higher as long as the water content of the lithium tetrafluoroborate solution is within the above range.

The above-obtained solution contains, as the solvent, a lithium battery solvent and thus can be used directly as it is as the lithium battery electrolytic solution. It is alternatively feasible to mix the above-obtained solution with ethylene carbonate, propylene carbonate, γ-butyrolactone or the like, or mix above-obtained solution with another lithium battery electrolytic solution or electrolyte, and then, use the mixed solution as the lithium battery electrolytic solution.

EXAMPLES

The present invention will be described in more detail below by way of the following examples. It should be noted that these examples are illustrative and are not intended to limit the present invention thereto.

Example 1

Within a 500-mL three-neck flask, 18.8 g of lithium fluoride was added and mixed into 350.0 g of diethyl carbonate. To this mixed solution, 4.1 g (27.0 mmol) of lithium hexafluorophosphate was added. While maintaining the mixed solution under cooling at 15° C., boron trifluoride gas, which had been diluted to 62 vol % with nitrogen gas, was introduced into the mixed solution via a gas introduction tube with a mass flow controller so that the mixed solution was bubbled with the boron trifluoride gas. The reaction was completed at the time when 44.7 g of the boron trifluoride was consumed. The amount of the lithium hexafluorophosphate used was 17 times the total amount of water in the diethyl carbonate, lithium fluoride and boron trifluoride (0.028 g (water content: 68 mass ppm), that is, 1.56 mmol) in terms of mol ratio. By the above operation step, the formation of the lithium tetrafluoroborate by reaction of the lithium fluoride and the boron trifluoride was carried out simultaneously with the removal of the water. The thus-obtained reaction solution had an acidic impurity content of 78 mass ppm and a water content of 6 mass ppm. The lithium tetrafluoroborate concentration of the reaction solution was 14.9 mass %. The lithium hexafluorophosphate concentration of the reaction solution was 1.0 mass %. The reaction solution was filtrated by a pressure filtration device to remove therefrom excessive lithium fluoride. After that, the reaction solution was concentrated for the removal of the acidic impurity component by heating the solution at 45° C. in a sealed reaction vessel and reducing the pressure inside the reaction vessel to an absolute pressure of 10 kPa or lower. The concentrated solution had an acidic impurity content of 29 mass ppm and a water content of 7 mass ppm. The lithium tetrafluoroborate concentration of the concentrated solution was 22.0 mass %. The lithium hexafluorophosphate concentration of the concentrated solution was 1.4 mass %. The concentrated solution was diluted with 73.0 g of diethyl carbonate. The diluted solution had an acidic impurity content of 23 mass ppm and a water content of 6 mass ppm. The lithium tetrafluoroborate concentration of the diluted solution was 17.5 mass %. The lithium hexafluorophosphate concentration of the diluted solution was 1.1 mass %. The diluted solution was 353.2 g in weight. The results are summarized in TABLE 1.

Example 2

Within a 500-mL three-neck flask, 18.8 g of lithium fluoride was added and mixed into 350.0 g of ethyl methyl carbonate. To this mixed solution, 4.1 g (27.0 mmol) of lithium hexafluorophosphate was added. While maintaining the mixed solution under cooling at 15° C., boron trifluoride gas, which had been diluted to 63 vol % with nitrogen gas, was introduced into the mixed solution via a gas introduction tube with a mass flow controller so that the mixed solution was bubbled with the boron trifluoride gas. The reaction was completed at the time when 44.8 g of the boron trifluoride was consumed. The amount of the lithium hexafluorophosphate used was 17 times the total amount of water in the ethyl methyl carbonate, lithium fluoride and boron trifluoride (0.029 g (water content: 70 mass ppm), that is, 1.61 mmol) in terms of mol ratio. By the above operation step, the formation of the lithium tetrafluoroborate by reaction of the lithium fluoride and the boron trifluoride was carried out simultaneously with the removal of the water. The thus-obtained reaction solution had an acidic impurity content of 84 mass ppm and a water content of 7 mass ppm. The lithium tetrafluoroborate concentration of the reaction solution was 14.9 mass %. The lithium hexafluorophosphate concentration of the reaction solution was 1.0 mass %. The reaction solution was filtrated by a pressure filtration device to remove therefrom excessive lithium fluoride. After that, the reaction solution was concentrated for the removal of the acidic impurity component by heating the solution at 45° C. in a sealed reaction vessel and reducing the pressure inside the reaction vessel to an absolute pressure of 10 kPa or lower. The concentrated solution had an acidic impurity content of 39 mass ppm and a water content of 7 mass ppm. The lithium tetrafluoroborate concentration of the concentrated solution was 21.8 mass %. The lithium hexafluorophosphate concentration of the concentrated solution was 1.4 mass %. The concentrated solution was diluted with 73.0 g of ethyl methyl carbonate. The diluted solution had an acidic impurity content of 31 mass ppm and a water content of 6 mass ppm. The lithium tetrafluoroborate concentration of the diluted solution was 17.6 mass %. The lithium hexafluorophosphate concentration of the diluted solution was 1.1 mass %. The diluted solution was 352.1 g in weight. The results are summarized in TABLE 1.

Example 3

Within a 500-mL three-neck flask, 18.8 g of lithium fluoride was added and mixed into 350.0 g of dimethyl carbonate. To this mixed solution, 4.1 g (27.0 mmol) of lithium hexafluorophosphate was added. While maintaining the mixed solution under cooling at 15° C., boron trifluoride gas, which had been diluted to 62 vol % with nitrogen gas, was introduced into the mixed solution via a gas introduction tube with a mass flow controller so that the mixed solution was bubbled with the boron trifluoride gas. The reaction was completed at the time when 44.7 g of the boron trifluoride was consumed. The amount of the lithium hexafluorophosphate used was 15 times the total amount of water in the dimethyl carbonate, lithium fluoride and boron trifluoride (0.033 g (water content: 80 mass ppm), that is, 1.84 mmol) in terms of mol ratio. By the above operation step, the formation of the lithium tetrafluoroborate by reaction of the lithium fluoride and the boron trifluoride was carried out simultaneously with the removal of the water. The thus-obtained reaction solution had an acidic impurity content of 69 mass ppm and a water content of 9 mass ppm. The lithium tetrafluoroborate concentration of the reaction solution was 14.9 mass %. The lithium hexafluorophosphate concentration of the reaction solution was 1.0 mass %. The reaction solution was filtrated by a pressure filtration device to remove therefrom excessive lithium fluoride. After that, the reaction solution was concentrated for the removal of the acidic impurity component by heating the solution at 45° C. in a sealed reaction vessel and reducing the pressure inside the reaction vessel to an absolute pressure of 10 kPa or lower. The concentrated solution had an acidic impurity content of 35 mass ppm and a water content of 7 mass ppm. The lithium tetrafluoroborate concentration of the concentrated solution was 21.6 mass %. The lithium hexafluorophosphate concentration of the concentrated solution was 1.4 mass %. The concentrated solution was diluted with 60.0 g of dimethyl carbonate. The diluted solution had an acidic impurity content of 23 mass ppm and a water content of 6 mass ppm. The lithium tetrafluoroborate concentration of the diluted solution was 17.9 mass %. The lithium hexafluorophosphate concentration of the diluted solution was 1.1 mass %. The diluted solution was 345.0 g in weight. The results are summarized in TABLE 1.

Example 4

Within a 500-mL three-neck flask, 18.8 g of lithium fluoride was added and mixed into 350.0 g of diethyl carbonate. While maintaining the mixed solution under cooling at 15° C., boron trifluoride gas, which had been diluted to 61 vol % with nitrogen gas, was introduced into the mixed solution via a gas introduction tube with a mass flow controller so that the mixed solution was bubbled with the boron trifluoride gas. The reaction was completed at the time when 44.7 g of the boron trifluoride was consumed. By the above operation step, lithium tetrafluoroborate was formed by reaction of the lithium fluoride and the boron trifluoride. The amount of water in the reaction solution was 0.031 g (water content: 75 mass ppm), that is, 1.72 mmol. The reaction solution was filtrated by a pressure filtration device to remove therefrom excessive lithium fluoride. To this reaction solution, 4.1 g (27.0 mmol) of lithium hexafluorophosphate was added. (The amount of the lithium hexafluorophosphate used was 16 times the amount of water in the reaction solution in terms of mol ratio.) The reaction solution was then stirred for 3 hours at 45° C. for the removal of the water. The thus-obtained reaction solution had an acidic impurity content of 82 mass ppm and a water content of 17 mass ppm. The lithium tetrafluoroborate concentration of the reaction solution was 14.9 mass %. The lithium hexafluorophosphate concentration of the reaction solution was 1.0 mass %. After that, the reaction solution was concentrated for the removal of the acidic impurity component by heating the solution at 45° C. in a sealed reaction vessel and reducing the pressure inside the reaction vessel to an absolute pressure of 10 kPa or lower. The concentrated solution had an acidic impurity content of 25 mass ppm and a water content of 6 mass ppm. The lithium tetrafluoroborate concentration of the concentrated solution was 21.9 mass %. The lithium hexafluorophosphate concentration of the concentrated solution was 1.4 mass %. The concentrated solution was diluted with 65.0 g of diethyl carbonate. The diluted solution had an acidic impurity content of 20 mass ppm and a water content of 5 mass ppm. The lithium tetrafluoroborate concentration of the diluted solution was 17.8 mass %. The lithium hexafluorophosphate concentration of the diluted solution was 1.1 mass %. The diluted solution was 347.2 g in weight. The results are summarized in TABLE 1.

Example 5

Within a 500-mL three-neck flask, 18.8 g of lithium fluoride was added and mixed into 350.0 g of dimethyl carbonate. While maintaining the mixed solution under cooling at 15° C., boron trifluoride gas, which had been diluted to 63 vol % with nitrogen gas, was introduced into the mixed solution via a gas introduction tube with a mass flow controller so that the mixed solution was bubbled with the boron trifluoride gas. The reaction was completed at the time when 45.0 g of the boron trifluoride was consumed. By the above operation step, lithium tetrafluoroborate was formed by reaction of the lithium fluoride and the boron trifluoride. The amount of water in the reaction solution was 0.030 g (water content: 72 mass ppm), that is, 1.66 mmol. The reaction solution was filtrated by a pressure filtration device to remove therefrom excessive lithium fluoride. To this reaction solution, 4.1 g (27.0 mmol) of lithium hexafluorophosphate was added. (The amount of the lithium hexafluorophosphate used was 16 times the amount of water in the reaction solution in terms of mol ratio.) The reaction solution was then stirred for 3 hours at 45° C. for the removal of the water. The thus-obtained reaction solution had an acidic impurity content of 94 mass ppm and a water content of 18 mass ppm. The lithium tetrafluoroborate concentration of the reaction solution was 14.9 mass %. The lithium hexafluorophosphate concentration of the reaction solution was 1.0 mass %. After that, the reaction solution was concentrated for the removal of the acidic impurity component by heating the solution at 45° C. in a sealed reaction vessel and reducing the pressure inside the reaction vessel to an absolute pressure of 10 kPa or lower. The concentrated solution had an acidic impurity content of 33 mass ppm and a water content of 8 mass ppm. The lithium tetrafluoroborate concentration of the concentrated solution was 21.7 mass %. The lithium hexafluorophosphate concentration of the concentrated solution was 1.4 mass %. The concentrated solution was diluted with 61.0 g of dimethyl carbonate. The diluted solution had an acidic impurity content of 27 mass ppm and a water content of 6 mass ppm. The lithium tetrafluoroborate concentration of the diluted solution was 17.9 mass %. The lithium hexafluorophosphate concentration of the diluted solution was 1.1 mass %. The diluted solution was 347.6 g in weight. The results are summarized in TABLE 1.

Example 6

Within a 500-mL three-neck flask, 18.8 g of lithium fluoride was added and mixed into 350.0 g of ethyl methyl carbonate. While maintaining the mixed solution under cooling at 15° C., boron trifluoride gas, which had been diluted to 64 vol % with nitrogen gas, was introduced into the mixed solution via a gas introduction tube with a mass flow controller so that the mixed solution was bubbled with the boron trifluoride gas. The reaction was completed at the time when 44.6 g of the boron trifluoride was consumed. By the above operation step, lithium tetrafluoroborate was formed by reaction of the lithium fluoride and the boron trifluoride. The amount of water in the reaction solution was 0.028 g (water content: 68 mass ppm), that is, 1.56 mmol. The reaction solution was filtrated by a pressure filtration device to remove therefrom excessive lithium fluoride. To this reaction solution, 4.1 g (27.0 mmol) of lithium hexafluorophosphate was added. (The amount of the lithium hexafluorophosphate used was 17 times the amount of water in the reaction solution in terms of mol ratio.) The reaction solution was then stirred for 3 hours at 45° C. for the removal of the water. The thus-obtained reaction solution had an acidic impurity content of 101 mass ppm and a water content of 16 mass ppm. The lithium tetrafluoroborate concentration of the reaction solution was 14.5 mass %. The lithium hexafluorophosphate concentration of the reaction solution was 1.0 mass %. After that, the reaction solution was concentrated for the removal of the acidic impurity component by heating the solution at 45° C. in a sealed reaction vessel and reducing the pressure inside the reaction vessel to an absolute pressure of 10 kPa or lower. The concentrated solution had an acidic impurity content of 30 mass ppm and a water content of 6 mass ppm. The lithium tetrafluoroborate concentration of the concentrated solution was 21.6 mass %. The lithium hexafluorophosphate concentration of the concentrated solution was 1.4 mass %. The concentrated solution was diluted with 65.0 g of ethyl methyl carbonate. The diluted solution had an acidic impurity content of 24 mass ppm and a water content of 5 mass ppm. The lithium tetrafluoroborate concentration of the diluted solution was 17.6 mass %. The lithium hexafluorophosphate concentration of the diluted solution was 1.1 mass %. The diluted solution was 350.4 g in weight. The results are summarized in TABLE 1.

Example 7

Within a 500-mL three-neck flask, 18.8 g of lithium fluoride was added and mixed into 336.7 g of diethyl carbonate. To this mixed solution, 2.0 g (13.2 mmol) of lithium hexafluorophosphate was added. While maintaining the mixed solution under cooling at 15° C., boron trifluoride gas, which had been diluted to 62 vol % with nitrogen gas, was introduced into the mixed solution via a gas introduction tube with a mass flow controller so that the mixed solution was bubbled with the boron trifluoride gas. The reaction was completed at the time when 44.7 g of the boron trifluoride was consumed. The amount of the lithium hexafluorophosphate used was 8 times the total amount of water in the diethyl carbonate, lithium fluoride and boron trifluoride (0.028 g (water content: 70 mass ppm), that is, 1.56 mmol) in terms of mol ratio. By the above operation step, the formation of the lithium tetrafluoroborate by reaction of the lithium fluoride and the boron trifluoride was carried out simultaneously with the removal of the water. The thus-obtained reaction solution had an acidic impurity content of 106 mass ppm and a water content of 13 mass ppm. The lithium tetrafluoroborate concentration of the reaction solution was 15.4 mass %. The lithium hexafluorophosphate concentration of the reaction solution was 0.5 mass %. The reaction solution was filtrated by a pressure filtration device to remove therefrom excessive lithium fluoride. After that, the reaction solution was concentrated for the removal of the acidic impurity component by heating the solution at 45° C. in a sealed reaction vessel and reducing the pressure inside the reaction vessel to an absolute pressure of 10 kPa or lower. The concentrated solution had an acidic impurity content of 37 mass ppm and a water content of 5 mass ppm. The lithium tetrafluoroborate concentration of the concentrated solution was 22.0 mass %. The lithium hexafluorophosphate concentration of the concentrated solution was 0.7 mass %. The concentrated solution was diluted with 68.0 g of diethyl carbonate. The diluted solution had an acidic impurity content of 30 mass ppm and a water content of 4 mass ppm. The lithium tetrafluoroborate concentration of the diluted solution was 17.7 mass %. The lithium hexafluorophosphate concentration of the diluted solution was 0.6 mass %. The diluted solution was 349.1 g in weight. The results are summarized in TABLE 1.

Example 8

Within a 500-mL three-neck flask, 18.8 g of lithium fluoride was added and mixed into 364.0 g of diethyl carbonate. To this mixed solution, 8.5 g (56.0 mmol) of lithium hexafluorophosphate was added. While maintaining the mixed solution under cooling at 15° C., boron trifluoride gas, which had been diluted to 63 vol % with nitrogen gas, was introduced into the mixed solution via a gas introduction tube with a mass flow controller so that the mixed solution was bubbled with the boron trifluoride gas. The reaction was completed at the time when 44.7 g of the boron trifluoride was consumed. The amount of the lithium hexafluorophosphate used was 31 times the total amount of water in the diethyl carbonate, lithium fluoride and boron trifluoride (0.032 g (water content: 75 mass ppm), that is, 1.78 mmol) in terms of mol ratio. By the above operation step, the formation of the lithium tetrafluoroborate by reaction of the lithium fluoride and the boron trifluoride was carried out simultaneously with the removal of the water. The thus-obtained reaction solution had an acidic impurity content of 101 mass ppm and a water content of 5 mass ppm. The lithium tetrafluoroborate concentration of the reaction solution was 14.4 mass %. The lithium hexafluorophosphate concentration of the reaction solution was 2.0 mass %. The reaction solution was filtrated by a pressure filtration device to remove therefrom excessive lithium fluoride. After that, the reaction solution was concentrated for the removal of the acidic impurity component by heating the solution at 45° C. in a sealed reaction vessel and reducing the pressure inside the reaction vessel to an absolute pressure of 10 kPa or lower. The concentrated solution had an acidic impurity content of 27 mass ppm and a water content of 5 mass ppm. The lithium tetrafluoroborate concentration of the concentrated solution was 21.5 mass %. The lithium hexafluorophosphate concentration of the concentrated solution was 2.4 mass %. The concentrated solution was diluted with 70.0 g of diethyl carbonate. The diluted solution had an acidic impurity content of 22 mass ppm and a water content of 4 mass ppm. The lithium tetrafluoroborate concentration of the diluted solution was 17.3 mass %. The lithium hexafluorophosphate concentration of the diluted solution was 2.2 mass %. The diluted solution was 357.2 g in weight. The results are summarized in TABLE 1.

Example 9

Within a 500-mL three-neck flask, 18.8 g of lithium fluoride was added and mixed into 350.0 g of diethyl carbonate. To this mixed solution, 0.5 g (3.3 mmol) of lithium hexafluorophosphate was added. While maintaining the mixed solution under cooling at 15° C., boron trifluoride gas, which had been diluted to 62 vol % with nitrogen gas, was introduced into the mixed solution via a gas introduction tube with a mass flow controller so that the mixed solution was bubbled with the boron trifluoride gas. The reaction was completed at the time when 44.7 g of the boron trifluoride was consumed. The amount of the lithium hexafluorophosphate used was 2 times the total amount of water in the diethyl carbonate, lithium fluoride and boron trifluoride (0.031 g (water content: 75 mass ppm), that is, 1.72 mmol) in terms of mol ratio. By the above operation step, the formation of the lithium tetrafluoroborate by reaction of the lithium fluoride and the boron trifluoride was carried out simultaneously with the removal of the water. The thus-obtained reaction solution had an acidic impurity content of 84 mass ppm and a water content of 20 mass ppm. The lithium tetrafluoroborate concentration of the reaction solution was 15.0 mass %. The lithium hexafluorophosphate concentration of the reaction solution was 0.1 mass %. The reaction solution was filtrated by a pressure filtration device to remove therefrom excessive lithium fluoride. After that, the reaction solution was concentrated for the removal of the acidic impurity component by heating the solution at 45° C. in a sealed reaction vessel and reducing the pressure inside the reaction vessel to an absolute pressure of 10 kPa or lower.

The concentrated solution had an acidic impurity content of 34 mass ppm and a water content of 19 mass ppm. The lithium tetrafluoroborate concentration of the concentrated solution was 22.1 mass %. The lithium hexafluorophosphate concentration of the concentrated solution was 0.2 mass %. The concentrated solution was diluted with 71.5 g of diethyl carbonate. The diluted solution had an acidic impurity content of 25 mass ppm and a water content of 14 mass ppm. The lithium tetrafluoroborate concentration of the diluted solution was 17.6 mass %. The lithium hexafluorophosphate concentration of the diluted solution was 0.1 mass %. The diluted solution was 351.1 g in weight. The results are summarized in TABLE 1.

Example 10

Within a 500-mL three-neck flask, 18.8 g of lithium fluoride was added and mixed into 350.0 g of diethyl carbonate. While maintaining the mixed solution under cooling at 15° C., boron trifluoride gas, which had been diluted to 62 vol % with nitrogen gas, was introduced into the mixed solution via a gas introduction tube with a mass flow controller so that the mixed solution was bubbled with the boron trifluoride gas. The reaction was completed at the time when 44.7 g of the boron trifluoride was consumed. By the above operation step, lithium tetrafluoroborate was formed by reaction of the lithium fluoride and the boron trifluoride. The amount of water in the reaction solution was 0.034 g (water content: 82 mass ppm), that is, 1.88 mmol. The reaction solution was filtrated by a pressure filtration device to remove therefrom excessive lithium fluoride. To this reaction solution, 0.5 g (3.3 mmol) of lithium hexafluorophosphate was added. (The amount of the lithium hexafluorophosphate used was 2 times the amount of water in the reaction solution in terms of mol ratio.) The reaction solution was then stirred for 3 hours at 45° C. for the removal of the water. The thus-obtained reaction solution had an acidic impurity content of 112 mass ppm and a water content of 20 mass ppm. The lithium tetrafluoroborate concentration of the reaction solution was 15.0 mass %. The lithium hexafluorophosphate concentration of the reaction solution was 0.1 mass %. After that, the reaction solution was concentrated for the removal of the acidic impurity component by heating the solution at 45° C. in a sealed reaction vessel and reducing the pressure inside the reaction vessel to an absolute pressure of 10 kPa or lower. The concentrated solution had an acidic impurity content of 40 mass ppm and a water content of 17 mass ppm. The lithium tetrafluoroborate concentration of the concentrated solution was 21.9 mass %. The lithium hexafluorophosphate concentration of the concentrated solution was 0.2 mass %. The concentrated solution was diluted with 65.0 g of diethyl carbonate. The diluted solution had an acidic impurity content of 38 mass ppm and a water content of 15 mass ppm. The lithium tetrafluoroborate concentration of the diluted solution was 17.8 mass %. The lithium hexafluorophosphate concentration of the diluted solution was 0.1 mass %. The diluted solution was 347.2 g in weight. The results are summarized in TABLE 1.

Example 11

Within a 500-mL three-neck flask, 18.8 g of lithium fluoride was added and mixed into 350.0 g of diethyl carbonate. To this mixed solution, 4.1 g (27.0 mmol) of lithium hexafluorophosphate was added. While maintaining the mixed solution under cooling at 15° C., boron trifluoride gas, which had been diluted to 62 vol % with nitrogen gas, was introduced into the mixed solution via a gas introduction tube with a mass flow controller so that the mixed solution was bubbled with the boron trifluoride gas. The reaction was completed at the time when 44.7 g of the boron trifluoride was consumed. The amount of the lithium hexafluorophosphate used was 15 times the total amount of water in the diethyl carbonate, lithium fluoride and boron trifluoride (0.033 g (water content: 80 mass ppm), that is, 1.84 mmol) in terms of mol ratio. By the above operation step, the formation of the lithium tetrafluoroborate by reaction of the lithium fluoride and the boron trifluoride was carried out simultaneously with the removal of the water. The thus-obtained reaction solution had an acidic impurity content of 94 mass ppm and a water content of 9 mass ppm. The lithium tetrafluoroborate concentration of the reaction solution was 14.9 mass %. The lithium hexafluorophosphate concentration of the reaction solution was 1.0 mass %. The reaction solution was filtrated by a pressure filtration device to remove therefrom excessive lithium fluoride. After that, the reaction solution was concentrated for the removal of the acidic impurity component by maintaining the solution at 20° C. in a sealed reaction vessel and reducing the pressure inside the reaction vessel to an absolute pressure of 10 kPa or lower. The concentrated solution had an acidic impurity content of 58 mass ppm and a water content of 9 mass ppm. The lithium tetrafluoroborate concentration of the concentrated solution was 22.3 mass %. The lithium hexafluorophosphate concentration of the concentrated solution was 1.4 mass %. The concentrated solution was diluted with 78.0 g of diethyl carbonate. The diluted solution had an acidic impurity content of 48 mass ppm and a water content of 8 mass ppm. The lithium tetrafluoroborate concentration of the diluted solution was 17.4 mass %. The lithium hexafluorophosphate concentration of the diluted solution was 1.1 mass %. The diluted solution was 355.2 g in weight. The results are summarized in TABLE 2.

Example 12

Within a 500-mL three-neck flask, 18.8 g of lithium fluoride was added and mixed into 350.0 g of diethyl carbonate. To this mixed solution, 4.1 g (27.0 mmol) of lithium hexafluorophosphate was added. While maintaining the mixed solution under heating at 55° C., boron trifluoride gas, which had been diluted to 62 vol % with nitrogen gas, was introduced into the mixed solution via a gas introduction tube with a mass flow controller so that the mixed solution was bubbled with the boron trifluoride gas. The reaction was completed at the time when 44.7 g of the boron trifluoride was consumed. The amount of the lithium hexafluorophosphate used was 16 times the total amount of water in the diethyl carbonate, lithium fluoride and boron trifluoride (0.031 g (water content: 75 mass ppm), that is, 1.72 mmol) in terms of mol ratio. By the above operation step, the formation of the lithium tetrafluoroborate by reaction of the lithium fluoride and the boron trifluoride was carried out simultaneously with the removal of the water. The thus-obtained reaction solution had an acidic impurity content of 125 mass ppm and a water content of 9 mass ppm. The lithium tetrafluoroborate concentration of the reaction solution was 14.9 mass %. The lithium hexafluorophosphate concentration of the reaction solution was 1.0 mass %. The reaction solution was filtrated by a pressure filtration device to remove therefrom excessive lithium fluoride. After that, the reaction solution was concentrated for the removal of the acidic impurity component by heating the solution at 45° C. in a sealed reaction vessel and reducing the pressure inside the reaction vessel to an absolute pressure of 10 kPa or lower. The concentrated solution had an acidic impurity content of 59 mass ppm and a water content of 8 mass ppm. The lithium tetrafluoroborate concentration of the concentrated solution was 22.2 mass %. The lithium hexafluorophosphate concentration of the concentrated solution was 1.4 mass %. The concentrated solution was diluted with 74.8 g of diethyl carbonate. The diluted solution had an acidic impurity content of 50 mass ppm and a water content of 7 mass ppm. The lithium tetrafluoroborate concentration of the diluted solution was 17.5 mass %. The lithium hexafluorophosphate concentration of the diluted solution was 1.1 mass %. The diluted solution was 353.1 g in weight. The results are summarized in TABLE 2.

Example 13

Within a 500-mL three-neck flask, 18.8 g of lithium fluoride was added and mixed into 350.0 g of diethyl carbonate. While maintaining the mixed solution under cooling at 15° C., boron trifluoride gas, which had been diluted to 62 vol % with nitrogen gas, was introduced into the mixed solution via a gas introduction tube with a mass flow controller so that the mixed solution was bubbled with the boron trifluoride gas. The reaction was completed at the time when 44.7 g of the boron trifluoride was consumed. By the above operation step, lithium tetrafluoroborate was formed by reaction of the lithium fluoride and the boron trifluoride. The amount of water in the reaction solution was 0.033 g (water content: 79 mass ppm), that is, 1.81 mmol. The reaction solution was filtrated by a pressure filtration device to remove therefrom excessive lithium fluoride. To this reaction solution, 4.1 g (27.0 mmol) of lithium hexafluorophosphate was added. (The amount of the lithium hexafluorophosphate used was 15 times the amount of water in the reaction solution in terms of mol ratio.) The reaction solution was then stirred for 3 hours at 45° C. for the removal of the water. The thus-obtained reaction solution had an acidic impurity content of 82 mass ppm and a water content of 17 mass ppm. The lithium tetrafluoroborate concentration of the reaction solution was 14.9 mass %. The lithium hexafluorophosphate concentration of the reaction solution was 1.0 mass %. After that, the reaction solution was concentrated for the removal of the acidic impurity component by maintaining the solution at 20° C. in a sealed reaction vessel and reducing the pressure inside the reaction vessel to an absolute pressure of 10 kPa or lower. The concentrated solution had an acidic impurity content of 55 mass ppm and a water content of 16 mass ppm. The lithium tetrafluoroborate concentration of the concentrated solution was 22.6 mass %. The lithium hexafluorophosphate concentration of the concentrated solution was 1.4 mass %. The concentrated solution was diluted with 75.7 g of diethyl carbonate. The diluted solution had an acidic impurity content of 48 mass ppm and a water content of 14 mass ppm. The lithium tetrafluoroborate concentration of the diluted solution was 17.7 mass %. The lithium hexafluorophosphate concentration of the diluted solution was 1.1 mass %. The diluted solution was 349.2 g in weight. The results are summarized in TABLE 2.

Example 14

Within a 500-mL three-neck flask, 18.8 g of lithium fluoride was added and mixed into 350.0 g of diethyl carbonate. To this mixed solution, 4.1 g (27.0 mmol) of lithium hexafluorophosphate was added. While maintaining the mixed solution under cooling at 15° C., boron trifluoride gas, which had been diluted to 62 vol % with nitrogen gas, was introduced into the mixed solution via a gas introduction tube with a mass flow controller so that the mixed solution was bubbled with the boron trifluoride gas. The reaction was completed at the time when 44.7 g of the boron trifluoride was consumed. The amount of the lithium hexafluorophosphate used was 13 times the total amount of water in the diethyl carbonate, lithium fluoride and boron trifluoride (0.036 g (water content: 89 mass ppm), that is, 2.04 mmol) in terms of mol ratio. By the above operation step, the formation of the lithium tetrafluoroborate by reaction of the lithium fluoride and the boron trifluoride was carried out simultaneously with the removal of the water. The thus-obtained reaction solution had an acidic impurity content of 84 mass ppm and a water content of 8 mass ppm. The lithium tetrafluoroborate concentration of the reaction solution was 14.9 mass %. The lithium hexafluorophosphate concentration of the reaction solution was 1.0 mass %. The reaction solution was filtrated by a pressure filtration device to remove therefrom excessive lithium fluoride. After that, the reaction solution was concentrated for the removal of the acidic impurity component by maintaining the solution at 20° C. in a sealed reaction vessel and reducing the pressure inside the reaction vessel to an absolute pressure of 10 kPa or lower. The concentrated solution had an acidic impurity content of 59 mass ppm and a water content of 7 mass ppm. The lithium tetrafluoroborate concentration of the concentrated solution was 22.5 mass %. The lithium hexafluorophosphate concentration of the concentrated solution was 1.4 mass %. The concentrated solution was diluted with 78.5 g of diethyl carbonate. The diluted solution had an acidic impurity content of 50 mass ppm and a water content of 6 mass ppm. The lithium tetrafluoroborate concentration of the diluted solution was 17.5 mass %. The lithium hexafluorophosphate concentration of the diluted solution was 1.1 mass %. The diluted solution was 353.1 g in weight. The results are summarized in TABLE 2.

Example 15

Within a 500-mL three-neck flask, 18.8 g of lithium fluoride was added and mixed into 350.0 g of diethyl carbonate. While maintaining the mixed solution under cooling at 15° C., boron trifluoride gas, which had been diluted to 61 vol % with nitrogen gas, was introduced into the mixed solution via a gas introduction tube with a mass flow controller so that the mixed solution was bubbled with the boron trifluoride gas. The reaction was completed at the time when 44.7 g of the boron trifluoride was consumed. By the above operation step, lithium tetrafluoroborate was formed by reaction of the lithium fluoride and the boron trifluoride. The amount of water in the reaction solution was 0.029 g (water content: 71 mass ppm), that is, 1.63 mmol. The reaction solution was filtrated by a pressure filtration device to remove therefrom excessive lithium fluoride. To this reaction solution, 4.1 g (27.0 mmol) of lithium hexafluorophosphate was added. (The amount of the lithium hexafluorophosphate used was 7 times the amount of water in the reaction solution in terms of mol ratio.) The reaction solution was then stirred for 3 hours at 45° C. for the removal of the water. The thus-obtained reaction solution had an acidic impurity content of 92 mass ppm and a water content of 17 mass ppm. The lithium tetrafluoroborate concentration of the reaction solution was 14.9 mass %. The lithium hexafluorophosphate concentration of the reaction solution was 1.0 mass %. After that, the reaction solution was concentrated for the removal of the acidic impurity component by heating the solution at 45° C. in a sealed reaction vessel and reducing the pressure inside the reaction vessel to an absolute pressure of 100 to 200 kPa. The concentrated solution had an acidic impurity content of 53 mass ppm and a water content of 11 mass ppm. The lithium tetrafluoroborate concentration of the concentrated solution was 22.6 mass %. The lithium hexafluorophosphate concentration of the concentrated solution was 1.4 mass %. The concentrated solution was diluted with 81.7 g of diethyl carbonate. The diluted solution had an acidic impurity content of 47 mass ppm and a water content of 9 mass ppm. The lithium tetrafluoroborate concentration of the diluted solution was 17.4 mass %. The lithium hexafluorophosphate concentration of the diluted solution was 1.1 mass %. The diluted solution was 355.2 g in weight. The results are summarized in TABLE 2.

Example 16

Within a 500-mL three-neck flask, 18.8 g of lithium fluoride was added and mixed into 350.0 g of diethyl carbonate. To this mixed solution, 4.1 g (27.0 mmol) of lithium hexafluorophosphate was added. While maintaining the mixed solution under cooling at 15° C., boron trifluoride gas, which had been diluted to 62 vol % with nitrogen gas, was introduced into the mixed solution via a gas introduction tube with a mass flow controller so that the mixed solution was bubbled with the boron trifluoride gas. The reaction was completed at the time when 44.7 g of the boron trifluoride was consumed. The amount of the lithium hexafluorophosphate used was 14 times the total amount of water in the diethyl carbonate, lithium fluoride and boron trifluoride (0.034 g (water content: 83 mass ppm), that is, 1.91 mmol) in terms of mol ratio. By the above operation step, the formation of the lithium tetrafluoroborate by reaction of the lithium fluoride and the boron trifluoride was carried out simultaneously with the removal of the water. The thus-obtained reaction solution had an acidic impurity content of 98 mass ppm and a water content of 6 mass ppm. The lithium tetrafluoroborate concentration of the reaction solution was 14.9 mass %. The lithium hexafluorophosphate concentration of the reaction solution was 1.0 mass %. The reaction solution was filtrated by a pressure filtration device to remove therefrom excessive lithium fluoride. After that, the reaction solution was concentrated for the removal of the acidic impurity component by heating the solution at 45° C. in a sealed reaction vessel and reducing the pressure inside the reaction vessel to an absolute pressure of 100 to 200 kPa. The concentrated solution had an acidic impurity content of 59 mass ppm and a water content of 7 mass ppm. The lithium tetrafluoroborate concentration of the concentrated solution was 22.7 mass %. The lithium hexafluorophosphate concentration of the concentrated solution was 1.4 mass %. The concentrated solution was diluted with 74.9 g of diethyl carbonate. The diluted solution had an acidic impurity content of 50 mass ppm and a water content of 6 mass ppm. The lithium tetrafluoroborate concentration of the diluted solution was 17.8 mass %. The lithium hexafluorophosphate concentration of the diluted solution was 1.1 mass %. The diluted solution was 347.2 g in weight. The results are summarized in TABLE 2.

Comparative Example 1

Within a 500-mL three-neck flask, 18.8 g of lithium fluoride was added and mixed into 247.0 g of diethyl carbonate. While maintaining the mixed solution under cooling at 15° C., boron trifluoride gas, which had been diluted to 61 vol % with nitrogen gas, was introduced into the mixed solution via a gas introduction tube with a mass flow controller so that the mixed solution was bubbled with the boron trifluoride gas. The reaction was completed at the time when 44.7 g of the boron trifluoride was consumed. The thus-obtained reaction solution had an acidic impurity content of 90 mass ppm and a water content of 80 mass ppm. The lithium tetrafluoroborate concentration of the reaction solution was 15.0 mass %. The reaction solution was filtrated by a pressure filtration device to remove therefrom excessive lithium fluoride, and then, diluted with 40.4 g of diethyl carbonate. The diluted solution had an acidic impurity content of 85 mass ppm and a water content of 75 mass ppm. The lithium tetrafluoroborate concentration of the diluted solution was 17.7 mass %. The diluted solution was 349.4 g in weight. The acid impurity content of the solution was not reduced to be 50 mass ppm or lower. The water content of the solution was not also reduced to be 15 mass ppm or lower. The results are summarized in TABLE 3.

Comparative Example 2

Within a 500-mL three-neck flask, 18.8 g of lithium fluoride was added and mixed into 350.0 g of diethyl carbonate. While maintaining the mixed solution under cooling at 15° C., boron trifluoride gas, which had been diluted to 61 vol % with nitrogen gas, was introduced into the mixed solution via a gas introduction tube with a mass flow controller so that the mixed solution was bubbled with the boron trifluoride gas. The reaction was completed at the time when 44.7 g of the boron trifluoride was consumed. The thus-obtained reaction solution had an acidic impurity content of 81 mass ppm and a water content of 81 mass ppm. The lithium tetrafluoroborate concentration of the reaction solution was 15.0 mass %. The reaction solution was filtrated by a pressure filtration device to remove therefrom excessive lithium fluoride. After that, the reaction solution was concentrated for the removal of the acidic impurity component by heating the solution at 45° C. in a sealed reaction vessel and reducing the pressure inside the reaction vessel to an absolute pressure of 10 kPa or lower. The concentrated solution had an acidic impurity content of 34 mass ppm and a water content of 77 mass ppm. The lithium tetrafluoroborate concentration of the concentrated solution was 22.9 mass %. The concentrated solution was diluted with 79.3 g of diethyl carbonate. The diluted solution had an acidic impurity content of 30 mass ppm and a water content of 70 mass ppm. The lithium tetrafluoroborate concentration of the diluted solution was 17.7 mass %. The diluted solution was 349.2 g in weight. The water content of the solution was not reduced to be 15 mass ppm or lower. The results are summarized in TABLE 3.

Comparative Example 3

Within a 500-mL three-neck flask, 18.8 g of lithium fluoride was added and mixed into 247.0 g of diethyl carbonate. While maintaining the mixed solution under cooling at 15° C., boron trifluoride gas, which had been diluted to 62 vol % with nitrogen gas, was introduced into the mixed solution via a gas introduction tube with a mass flow controller so that the mixed solution was bubbled with the boron trifluoride gas. The reaction was completed at the time when 44.8 g of the boron trifluoride was consumed. By the above operation step, lithium tetrafluoroborate was formed by reaction of the lithium fluoride and the boron trifluoride. The amount of water in the reaction solution was 0.025 g (water content: 80 mass ppm), that is, 1.38 mmol. The reaction solution was filtrated by a pressure filtration device to remove therefrom excessive lithium fluoride. To this reaction solution, 3.1 g (20.4 mmol) of lithium hexafluorophosphate was added. (The amount of the lithium hexafluorophosphate used was 15 times the amount of water in the reaction solution in terms of mol ratio.) The reaction solution was then stirred for 3 hours at 45° C. for the removal of the water. The thus-obtained reaction solution had an acidic impurity content of 88 mass ppm and a water content of 15 mass ppm. The lithium tetrafluoroborate concentration of the reaction solution was 20.0 mass %. The lithium hexafluorophosphate concentration of the reaction solution was 1.0 mass %. The reaction solution was then diluted with 44.3 g of diethyl carbonate. The diluted solution had an acidic impurity content of 80 mass ppm and a water content of 13 mass ppm. The lithium tetrafluoroborate concentration of the diluted solution was 17.5 mass %. The lithium hexafluorophosphate concentration of the diluted solution was 0.9 mass %. The diluted solution was 353.3 g in weight. The acidic impurity content of the solution was not reduced to be 50 mass ppm or lower. The results are summarized in TABLE 3.

Comparative Example 4

Within a 500-mL three-neck flask, 18.8 g of lithium fluoride was added and mixed into 350.0 g of diethyl carbonate. While maintaining the mixed solution under cooling at 15° C., boron trifluoride gas, which had been diluted to 62 vol % with nitrogen gas, was introduced into the mixed solution via a gas introduction tube with a mass flow controller so that the mixed solution was bubbled with the boron trifluoride gas. The reaction was completed at the time when the lithium fluoride in the diethyl carbonate disappeared. At this time, the amount of the boron trifluoride consumed was 49.3 g. The thus-obtained reaction solution had an acidic impurity content of 424 mass ppm and a water content of 76 mass ppm. The lithium tetrafluoroborate concentration of the reaction solution was 16.3 mass %. After that, the reaction solution was concentrated for the removal of the acidic impurity component by heating the solution at 50° C. in a sealed reaction vessel and reducing the pressure inside the reaction vessel to an absolute pressure of 10 kPa or lower. The concentrated solution had an acidic impurity content of 35 mass ppm and a water content of 38 mass ppm. The lithium tetrafluoroborate concentration of the concentrated solution was 23.3 mass %. The concentrated solution was diluted with 92.2 g of diethyl carbonate. The diluted solution had an acidic impurity content of 30 mass ppm and a water content of 32 mass ppm. The lithium tetrafluoroborate concentration of the diluted solution was 17.7 mass %. The diluted solution was 383.6 g in weight. The water content of the solution was not reduced to be 15 mass ppm or lower. The results are summarized in TABLE 3.

TABLE 1

| | Production method | Water removing agent | | Temperature (° C.) of reaction solution in water removal step or reaction/water removal step | Concentration (mass ppm) after water removal | |
|---|---|---|---|---|---|---|
| | | Kind | Amount (mol ratio relative to water amount) | | Acidic impurity content | Water content |
| Example 1 | Reaction/water removal step | Lithium hexafluoro-phosphate | 17 | 15 | 78 | 6 |
| Example 2 | → Acid impurity removal step | | 17 | 15 | 84 | 7 |
| Example 3 | → Dilution step | | 15 | 15 | 69 | 9 |
| Example 4 | Reaction step | | 16 | 45 | 82 | 17 |
| Example 5 | → Water removal step | | 16 | 45 | 94 | 18 |
| Example 6 | → Acid impurity removal step → Dilution step | | 17 | 45 | 101 | 16 |
| Example 7 | Reaction/water removal step | | 8 | 15 | 106 | 13 |
| Example 8 | → Acid impurity removal step | | 31 | 15 | 101 | 5 |
| Example 9 | → Dilution step | | 2 | 15 | 84 | 20 |
| Example 10 | Reaction step → Water removal step → Acid impurity removal step → Dilution step | | 2 | 45 | 112 | 20 |

| | Temperature (° C.) of reaction solution in acidic impurity removal step | Pressure (absolute pressure) in acidic impurity removal step | Concentration (mass ppm) after acidic impurity removal | | Concentration (mass ppm) after dilution | |
|---|---|---|---|---|---|---|
| | | | Acidic impurity content | Water content | Acidic impurity content | Water content |
| Example 1 | 45 | ≤10 kPa | 29 | 7 | 23 | 6 |
| Example 2 | 45 | ≤10 kPa | 39 | 7 | 31 | 6 |
| Example 3 | 45 | ≤10 kPa | 35 | 7 | 23 | 6 |
| Example 4 | 45 | ≤10 kPa | 25 | 6 | 20 | 5 |
| Example 5 | 45 | ≤10 kPa | 33 | 8 | 27 | 6 |
| Example 6 | 45 | ≤10 kPa | 30 | 6 | 24 | 5 |
| Example 7 | 45 | ≤10 kPa | 37 | 5 | 30 | 4 |
| Example 8 | 45 | ≤10 kPa | 27 | 5 | 22 | 4 |
| Example 9 | 45 | ≤10 kPa | 34 | 19 | 25 | 14 |
| Example 10 | 45 | ≤10 kPa | 40 | 17 | 38 | 15 |

TABLE 2

|  | Production method | Water removing agent Kind | Water removing agent Amount (mol ratio relative to water amount) | Temperature (° C.) of reaction solution in water removal step or reaction/water removal step | Concentration (mass ppm) after water removal Acidic impurity content | Concentration (mass ppm) after water removal Water content |
|---|---|---|---|---|---|---|
| Example 11 | Reaction/water removal step → Acid impurity removal step → Dilution step | Lithium hexafluoro-phosphate | 15 | 15 | 94 | 9 |
| Example 12 | | | 16 | 55 | 125 | 9 |
| Example 13 | Reaction step → Water removal step → Acid impurity removal step → Dilution step | | 15 | 45 | 82 | 17 |
| Example 14 | Reaction/water removal step → Acid impurity removal step → Dilution step | | 13 | 15 | 84 | 8 |
| Example 15 | Reaction step → water removal step → Acid impurity removal step → Dilution step | | 17 | 45 | 92 | 17 |
| Example 16 | Reaction/water removal step → Acid impurity removal step → Dilution step | | 14 | 15 | 98 | 6 |

|  | Temperature (° C.) of reaction solution in acidic impurity removal step | Pressure (absolute pressure) in acidic impurity removal step | Concentration (mass ppm) after acidic impurity removal Acidic impurity content | Concentration (mass ppm) after acidic impurity removal Water content | Concentration (mass ppm) after dilution Acidic impurity content | Concentration (mass ppm) after dilution Water content |
|---|---|---|---|---|---|---|
| Example 11 | 20 | ≤10 kPa | 58 | 9 | 48 | 8 |
| Example 12 | 45 | ≤10 kPa | 59 | 8 | 50 | 7 |
| Example 13 | 20 | ≤10 kPa | 55 | 16 | 48 | 14 |
| Example 14 | 20 | ≤10 kPa | 59 | 7 | 50 | 6 |
| Example 15 | 45 | 100 to 200 kPa | 53 | 11 | 47 | 9 |
| Example 16 | 45 | 100 to 200 kPa | 59 | 7 | 50 | 6 |

TABLE 3

|  | Production method | Water removing agent Kind | Water removing agent Amount (mol ratio relative to water amount) | Temperature (° C.) of reaction solution in water removal step or reaction/water removal step | Concentration (mass ppm) after water removal Acidic impurity content | Concentration (mass ppm) after water removal Water content |
|---|---|---|---|---|---|---|
| Comparative Example 1 | Reaction step → Dilution step | — | — | — | — | — |
| Comparative Example 2 | Reaction step → Acid impurity removal step → Dilution step | — | — | — | — | — |
| Comparative Example 3 | Reaction step → Water removal step → Dilution step | Lithium hexafluoro-phosphate | 15 | 45 | 88 | 15 |
| Comparative Example 4 | Reaction step → Acid impurity removal step → Dilution step | — | — | — | — | — |

|  | Temperature (° C.) of reaction solution in acidic impurity removal step | Pressure (absolute pressure) in acidic impurity removal step | Concentration (mass ppm) after acidic impurity removal Acidic impurity content | Concentration (mass ppm) after acidic impurity removal Water content | Concentration (mass ppm) after dilution Acidic impurity content | Concentration (mass ppm) after dilution Water content |
|---|---|---|---|---|---|---|
| Comparative Example 1 | — | — | — | — | 85 | 75 |
| Comparative Example 2 | 45 | ≤10 kPa | 34 | 77 | 30 | 70 |

TABLE 3-continued

| | | | | | |
|---|---|---|---|---|---|
| Comparative Example 3 | — | — | — | — | 80 | 13 |
| Comparative Example 4 | 50 | ≤10 kPa | 35 | 38 | 30 | 32 |

As described above, it is possible according to the present invention to provide the lithium tetrafluoroborate solution with less acidic impurity content and less water content for use as a lithium battery electrolytic solution.

Although the present invention has been described above with reference to the specific exemplary embodiment, the present invention is not limited to the above-described exemplary embodiment. Various modifications and variations of the embodiment described above can be made without departing from the scope of the present invention.

The invention claimed is:

1. A production method of a lithium tetrafluoroborate solution for use as a lithium battery electrolytic solution, comprising the steps of:
   (a) reacting lithium fluoride and boron trifluoride in a chain carbonate ester solvent, thereby obtaining a reaction solution of the lithium tetrafluoroborate dissolved in the chain carbonate ester solvent;
   (b) adding to the reaction solution at least one compound selected from the group consisting of lithium hexafluorophosphate, lithium hexafluoroarsenate, or lithium hexafluoroantimonate, thereby reacting water present in the reaction solution and generating an acidic impurity component;
   (c) removing the acidic impurity-component from the reaction solution by concentrating the reaction solution after step (b); and
   (d) diluting the concentrated solution after step (c),
   wherein the lithium tetrafluoroborate solution has an acidic impurity content of 50 mass ppm or lower and a water content of 15 mass ppm or lower.

2. The production method of the lithium tetrafluoroborate solution for use as the lithium battery electrolytic solution according to claim 1, wherein, in step (b), the compound is added in an amount of 2.5 to 500 times the amount of water contained in the reaction solution in terms of mol ratio.

3. The production method of the lithium tetrafluoroborate solution for use as the lithium battery electrolytic solution according to claim 1, wherein step (b) is performed by maintaining the reaction solution at a temperature of 15 to 50° C.

4. The production method of the lithium tetrafluoroborate solution for use as the lithium battery electrolytic solution according to claim 1, wherein step (c) is performed by maintaining the reaction solution in a sealed reaction vessel at a temperature of 25 to 50° C. under a reduced pressure of 100 Pa to 100 kPa in terms of absolute pressure.

5. A production method of a lithium tetrafluoroborate solution for use as a lithium battery electrolytic solution, comprising the steps of:
   (a) reacting lithium fluoride and boron trifluoride in the presence of at least one compound selected from the group consisting of lithium hexafluorophosphate, lithium hexafluoroarsenate and lithium hexafluoroantimonate in a chain carbonate ester solvent, thereby obtaining a reaction solution of the lithium tetrafluoroborate dissolved in the chain carbonate ester solvent, reacting water present in the reaction solution, and generating an acidic impurity component;
   (b) removing the acidic impurity component from the reaction solution by concentrating the reaction solution after step (a); and
   (c) diluting the concentrated solution after step (b),
   wherein the lithium tetrafluoroborate solution has an acidic impurity content of 50 mass ppm or lower and a water content of 15 mass ppm or lower.

6. The production method of the lithium tetrafluoroborate solution for use as the lithium battery electrolytic solution according to claim 5, wherein, in step (a), the compound is used in an amount of 2.5 to 500 times the total amount of water contained in the chain carbonate ester solvent, lithium fluoride and boron trifluoride as raw materials of the reaction solution in terms of mol ratio.

7. The production method of the lithium tetrafluoroborate solution for use as the lithium battery electrolytic solution according to claim 5, wherein step (a) is performed by maintaining the reaction solution at a temperature of −40 to 50° C.

8. The production method of the lithium tetrafluoroborate solution for use as the lithium battery electrolytic solution according to claim 5, wherein step (b) is performed by maintaining the reaction solution in a sealed reaction vessel at a temperature of 25 to 50° C. under a reduced pressure of 100 Pa to 100 kPa in terms of absolute pressure.

* * * * *